United States Patent [19]  [11] 4,395,337
Ciepiela  [45] Jul. 26, 1983

[54] TREATMENT OF BRACKISH WATER

[75] Inventor: Edmund J. Ciepiela, Willowdale, Canada

[73] Assignee: Francis Hankin & Co. Limited, Scarborough, Canada

[21] Appl. No.: 277,648

[22] Filed: Jun. 26, 1981

[30] Foreign Application Priority Data

Jul. 1, 1980 [GB] United Kingdom ............... 8021481

[51] Int. Cl.³ .............................................. C02F 1/46
[52] U.S. Cl. .................................... 210/703; 210/721; 210/748; 210/760; 204/185
[58] Field of Search ............... 210/642, 669, 707, 708, 210/712, 721, 737, 748, 760, 750; 204/184, 185

[56] References Cited

U.S. PATENT DOCUMENTS 3,627,479 12/1971 Yee ................................. 210/712 X
3,707,464 12/1972 Burns et al. ..................... 210/712 X
3,864,251 2/1975 Cymbalisty ........................ 210/703
4,016,075 4/1977 Wilkins .............................. 210/712

Primary Examiner—Thomas G. Wyse
Attorney, Agent, or Firm—Sim & McBurney

[57] ABSTRACT

Brackish water resulting from steam extraction of heavy crude oils, including oil sands bitumen, is processed for reuse by removing hydrocarbon contamination and removing mineral contamination. The purified water can be boiled in conventional boilers without scaling or fouling occurring. Heat economy is used in carrying out the process.

8 Claims, 1 Drawing Figure

TREATMENT OF BRACKISH WATER

FIELD OF INVENTION

The present invention relates to the treatment of brackish water from oil sands recovery.

BACKGROUND TO THE INVENTION

Proposals have been made to recover bitumen from oil sand deposits occurring between 500 and 2,000 feet below ground level in the Athabasca region of Alberta, Canada by the utilization of steam to render the bitumen flowable and the removal of the bitumen from the deposit in suspension in hot water (about 180° to 200° F.) under the influence of the steam pressure. After separation of the bitumen from the aqueous phase there is left "brackish water" which contains considerable mineral concentrations and also residual hydrocarbons.

Both of the contaminants inhibit reutilization of the brackish water for steam production, which is required to be produced at about 1,500 to 2,000 psi, since the minerals scale the reboiler tubes and the hydrocarbons cause fouling of boiler parts. The volume of water required for steam extraction is substantial, amounting to approximately 3 to 9 barrels of water per barrel of bitumen recovered. The inability to utilize the brackish water for steam regeneration imposes a considerable strain on the limited water resources of the region and also poses a considerable disposal problem.

SUMMARY OF INVENTION

The present invention is directed to a procedure for treatment of the brackish water to render the same susceptible of reuse in conventional boilers for steam generation. The brackish water which is treated in accordance with this invention may arise from any steam extraction process for heavy crude oils, but the invention is particularly directed to the treatment of brackish water arising from the extraction of bitumen from oil sands.

The brackish water is first subjected to oil removal by separating out as much as of the free oil as possible, such as, by using gravity separation and/or air flotation, and then stripping any residual oil by ozone treatment. The hydrocarbon-free water then is subjected to demineralization. The demineralization is effected by a first electrodialysis reversal step to remove minerals other than silica and a second silica removal step.

The brackish water which is treated in accordance with this invention may have a variable concentration of mineral and hydrocarbon contaminants, as outlined in the following Table:

TABLE

| Contaminant | Concentration (ppm) | |
|---|---|---|
| | Average | Peak |
| Sodium | 400 | 2000 |
| Calcium | 0 | 60 |
| Magnesium | 0 | 35 |
| Chloride | 400 | 5000 |
| Bicarbonate | 400 | 2000 |
| Sulphate | 100 | 400 |
| Carbonate | 0 | 200 |
| Silica | 100 | 200 |
| Iron | 0 | 2 |
| Sulphide | 0 | 20 |
| Hydrocarbon | 50 | 20,000 |

BRIEF DESCRIPTION OF DRAWING

The sole FIGURE of the accompanying drawing is a flow sheet illustrating the preferred embodiment of the invention.

DESCRIPTION OF PREFERRED EMBODIMENT

Figure 1:
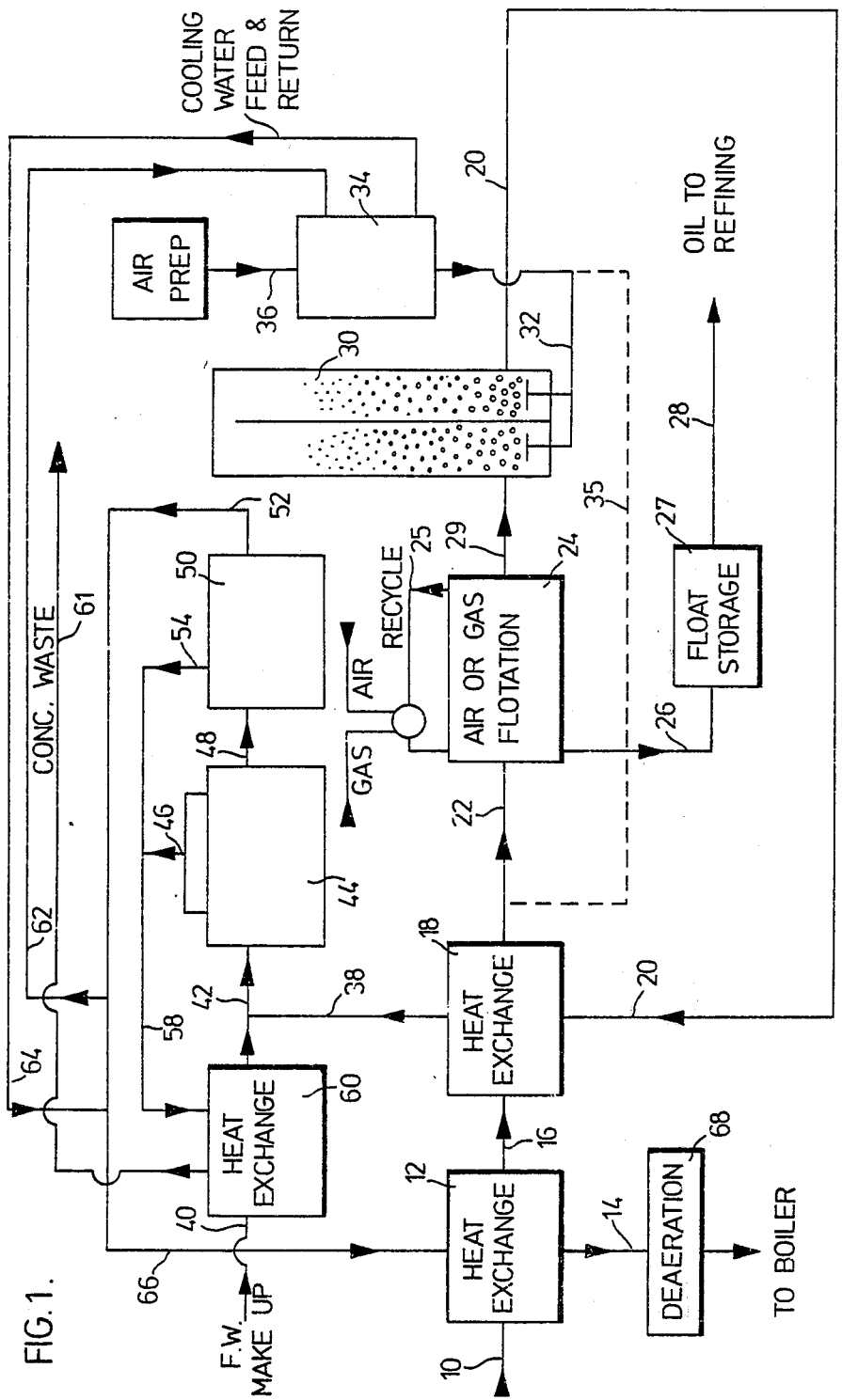

Referring to the drawing, raw brackish water from the steam extraction of oil sands and containing hydrocarbon contamination, in the form of bitumen of about 10° to 15° API viscosity and mineral contamination, is passed by line 10 to a first heat exchanger 12 wherein the heat value thereof is used to heat purified water passing to the reboiler by line 14.

The partially cooled water then is passed by line 16 to a second heat exchanger 18 wherein the brackish water is further cooled and the heat recovered is used to heat hydrocarbon-free water in line 20. The use of the two heat exchangers 12 and 18 enables the sensible heat of the brackish water, which is typically at a temperature of about 180° to about 200° F., to be recovered in a useful manner, and improves the overall thermal economy of the process.

The cooled brackish water from the second heat exchanger 18 is passed by line 22 to an air flotation tank 24 wherein the majority of the bitumen is separated. The air flotation tank 24 may have any convenient construction and may, for example, employ a pressurized recycle loop 25. Although air is usually used in the flotation step, any other convenient gas may be used. The effect of the air flotation in bitumen separation may be augmented by a gravity separator (not shown), if desired.

The action of the air in the air flotation tank 24 causes suspended bitumen particles in the brackish water to separate as a surface layer, often as an emulsion, which may be separated from the water in any convenient manner, for example, a mechanical skimmer. This bitumen layer is removed from the flotation tank 24 by line 26 to a storage tank 27 from which the bitumen, after dewatering, if required, may be passed by line 28 to a refining and upgrading operation.

The aqueous phase resulting from the flotation tank 24 and having only a small residual hydrocarbon content, typically less than 10 ppm, is passed by line 29 to an ozone contact tower 30 of any convenient construction wherein the residual amounts of hydrocarbon are removed by oxidation by the ozone. An ozone-containing gas stream is fed to the ozone contact tower 30 by line 32 from an ozone generator 34 of any convenient construction for formation of ozone from air or oxygen fed by line 36.

As may be seen by the dotted line 35, some ozone may be used to treat the brackish water in line 22 prior to air flotation, so as to improve the bitumen separation in the air flotation tank 24.

The ozone treatment in the ozone contact tower 30 in addition to removing hydrocarbons by oxidation also removes by oxidation any sulphur compounds present in the aqueous phase entering the tower 30 by line 29. The aqueous phase which results from the ozone contact tower 30 is substantially free from hydrocarbons but still contains all the minerals of the brackish water. This hydrocarbon-free aqueous phase is forwarded by line 20 to the heat exchange operation in heat exchanger 18.

After passage through the heat exchanger 18, the heated hydrocarbon-free stream in line 38 is mixed with fresh make-up water in line 40 to provide an aqueous stream in line 42 which is passed to an electrodialysis reversal unit 44 of any convenient construction. Where the make-up water is substantially mineral free, it may be added after the demineralization steps, if desired.

The electrodialysis reversal unit 44 removes, in known manner, all the mineral species as a concentrated waste stream 46, with the exception of silica, which remains in the purified water in line 48. Silica removal is effected in a silica removal unit 50, which may take the form of an ion-exchange unit, an alumina adsorption column or other suitable silica-removal means, so that a substantially mineral-free and hydrocarbon-free aqueous stream results in line 52.

The silica waste removed by the silica removal unit 50 is passed by line 54 to mix with the concentrated waste stream 46 removed from the electrodialysis removal unit 44 to form a combined concentrated mineral waste stream 58 for disposal. The concentrated waste stream 58 is passed through a heat exchanger 60 to recover the heat value thereof and to provide heat to the fresh water make-up stream 40, before passing by line 61 to disposal.

The purified water in line 52 is in suitable form for boiling for steam formation in conventional boilers without fear of scaling and fouling of the boilers. The purified water in line 52 may be used to provide cooling water for the ozone generator 34, by lines 62 and 64. The purified water in line 66 is passed to a boiler by line 14 after passage through heat exchanger 12. Deaeration of the purified water in a deaerator 68 may be effected, if desired.

The procedure described above with respect to the accompanying drawing, therefore, removes the contaminants from the brackish water which currently prevent its reuse for steam generation, and at the same time achieves thermal economy through the use of heat exchangers, so that the heat value of the hot brackish water is not lost.

SUMMARY OF DISCLOSURE

In summary of this disclosure, the present invention achieves the complete removal of contaminants from brackish water, enabling the same to be reused in oil recovery, in an efficient and economic manner. Modifications are possible within the scope of this invention.

What I claim is:

1. A method of treating hydrocarbon- and mineral-contaminated brackish water from the steam extraction of a heavy oil from a subterranean deposit thereof to render the same susceptible of reuse in steam regeneration, which comprises:
    (a) removing hydrocarbon contamination from the brackish water by:
       (i) causing a substantial proportion of said hydrocarbon contamination to separate from the brackish water as a substantially continuous phase,
       (ii) separating the continuous phase from the hydrocarbon contamination-depleted brackish water, and
       (iii) oxidizing any residual hydrocarbon contamination in the hydrocarbon contamination-depleted brackish water; and
    (b) subsequently removing mineral contamination from the brackish water by subjecting hydrocarbon contamination-free brackish water to reverse electrolysis to remove all mineral contaminants therefrom except for silica and removing silica from the electrodialyzed aqueous phase, thereby to form decontaminated water suitable for boiling to form steam.

2. The method of claim 1, wherein said hydrocarbon phase separation is effected by air flotation of the hydrocarbon contamination.

3. The method of claim 1 or 2 wherein said oxidation is effected using ozone.

4. A method of treating hydrocarbon- and mineral-contaminated brackish water from the steam extraction of a heavy oil from a subterranean deposit thereof to render the brackish water suitable for use in steam formation for use in said steam extraction, which comprises:
    (a) feeding hot brackish water from separation of steam-extracted heavy oil into heat-exchange relationship with purified decontaminated water to heat the same, partially recover the heat value of said hot brackish water and form a partially-cooled brackish water,
    (b) feeding the partially-cooled brackish water into heat exchange relationship with mineral-contaminated hydrocarbon-free brackish water to heat the same, recover heat value from the partially-cooled brackish water and form cooled brackish water,
    (c) subjecting the cooled brackish water to air flotation to separate at least a substantial proportion of said hydrocarbon contamination from the brackish water in the form of a surface layer of hydrocarbon contamination floating on a subsurface layer of hydrocarbon-depleted brackish water,
    (d) removing said surface layer from said subsurface layer,
    (e) subjecting said hydrocarbon-depleted brackish water to ozone stripping to oxidize any residual hydrocarbon contamination and thereby remove the same from the brackish water and form said mineral-contaminated hydrocarbon-free brackish water,
    (f) passing said mineral-contaminated hydrocarbon-free brackish water into said heat-exchange relationship with said partially-cooled brackish water to form warmed mineral-contaminated hydrocarbon-free brackish water,
    (g) subjecting said warmed mineral-contaminated hydrocarbon-free brackish water to electrodialysis reversal to remove mineral contaminants from the same with the exception of silica to form a silica-contaminated water,
    (h) subjecting said silica-contaminated water to silica removal to form said purified decontaminated water, and
    (i) passing said purified decontaminated water into said heat-exchange relationship with said hot brackish water to form warmed purified decontaminated water suitable for boiling to form steam.

5. The method of claim 4, wherein fresh makeup water is added to said warmed mineral-contaminated hydrocarbon-free brackish water prior to said electrodialysis reversal.

6. The method of claim 5, wherein warm mineral-containing concentrates recovered from said electrodialysis reversal and silica removal steps are passed into heat exchange relationship with said fresh make-up water to recover the heat value of said warm mineral-containing concentrates prior to disposal of the same.

7. The method of claim 4 wherein said ozone is formed from an oxygen-containing gas and said purified decontaminated water is used as cooling water in the ozone-forming reaction prior to said passage into said heat-exchange relationship with said hot brackish water.

8. The method of claim 4 including deaerating the warmed purified decontaminated water.

* * * * *